Feb. 25, 1964 M. M. STERN ETAL 3,122,650

SENSE WINDING AMPLIFICATION AND DISCRIMINATION CIRCUITS

Filed Nov. 7, 1960 2 Sheets-Sheet 1

INVENTORS
MICHAEL M. STERN
THOMAS E. BAKER
BY
F. I. Sullivan
ATTORNEY

Feb. 25, 1964 M. M. STERN ETAL 3,122,650

SENSE WINDING AMPLIFICATION AND DISCRIMINATION CIRCUITS

Filed Nov. 7, 1960 2 Sheets-Sheet 2

INVENTOR.
MICHAEL M. STERN
BY THOMAS E. BAKER
F. L. Sullivan
ATTORNEY

United States Patent Office 3,122,650
Patented Feb. 25, 1964

3,122,650

SENSE WINDING AMPLIFICATION AND DISCRIMINATION CIRCUITS

Michael M. Stern, Brookline, and Thomas E. Baker, Framingham, Mass., assignors to Sylvania Electric Products Inc., a corporation of Delaware Filed Nov. 7, 1960, Ser. No. 67,571
3 Claims. (Cl. 307—88.5)

This invention is concerned with electronic data processing equipment and particularly with improvements in sense amplifiers for the output of magnetic core memory systems.

The principal function of the sense amplifier in a magnetic core memory system is to distinguish between the binary "0" and "1" signal output from a selected core and to amplify the "1" output so that it may set a flip-flop in the output circuit. These amplifiers are essentially three-stage devices. The first stage is employed to provide Class A amplification of the sensed output signal. The function of the second stage is to discriminate between a noisy "0" and a "1" signal. The third stage operates as a pulse shaper and gate. The most important requirement of this type of amplifier is to maintain a constant rejection level, i.e., any signal below a certain critical level must be treated as a "0" indication and any signal above the critical level must be accepted as a "1" indication. A disadvantage of sense amplifiers hitherto employed has been that fluctuations in voltage supply cause variations in this critical discrimination level.

A principal object of the present invention is to provide a sense amplifier which will maintain a constant discrimination level despite variations in voltage supply. Another object is to provide an improved sense amplifier for use in electronic data processing systems.

These and related objects are accomplished in one illustrative embodiment of the invention which will be described as employing oppositely polarized transistors in successive stages within the sense amplifier to provide automatic compensation within the amplifier for fluctuations of its voltage supply. For example, if the first and second stages of the amplifier employ NPN and PNP transistors, respectively, the positive supply is connected to the collector of the first and to the emitter of the second stage while the negative supply is connected to the emitter of the first and to the collector of the second stage. By proper selection of circuit components such as resistors, an increase in gain of the first stage due to a change in the positive supply will be exactly compensated by a decrease of gain in the second stage due to the same positive supply variation and a similar effect is experienced with variations in the negative supply.

Figure 1:
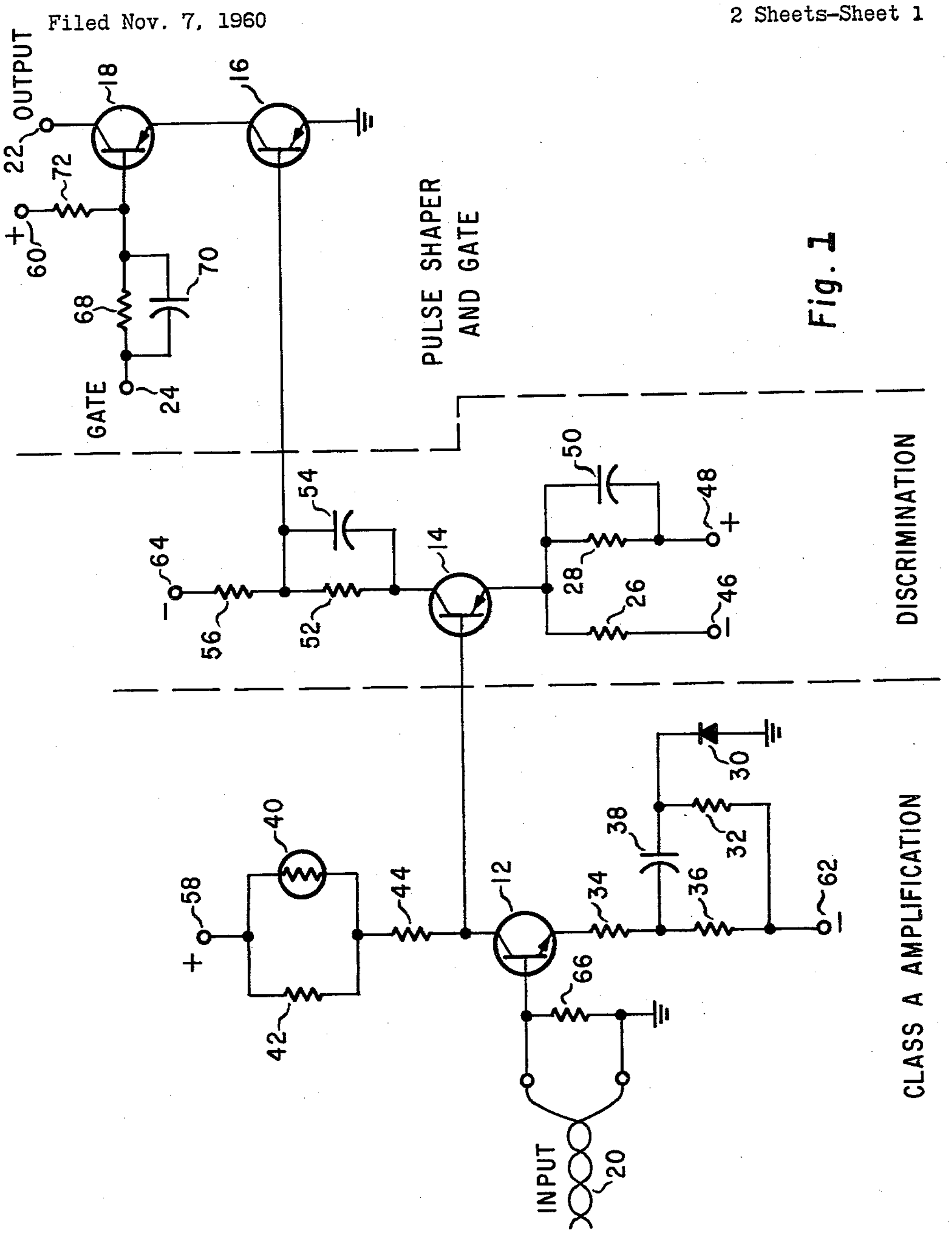
Figure 2:
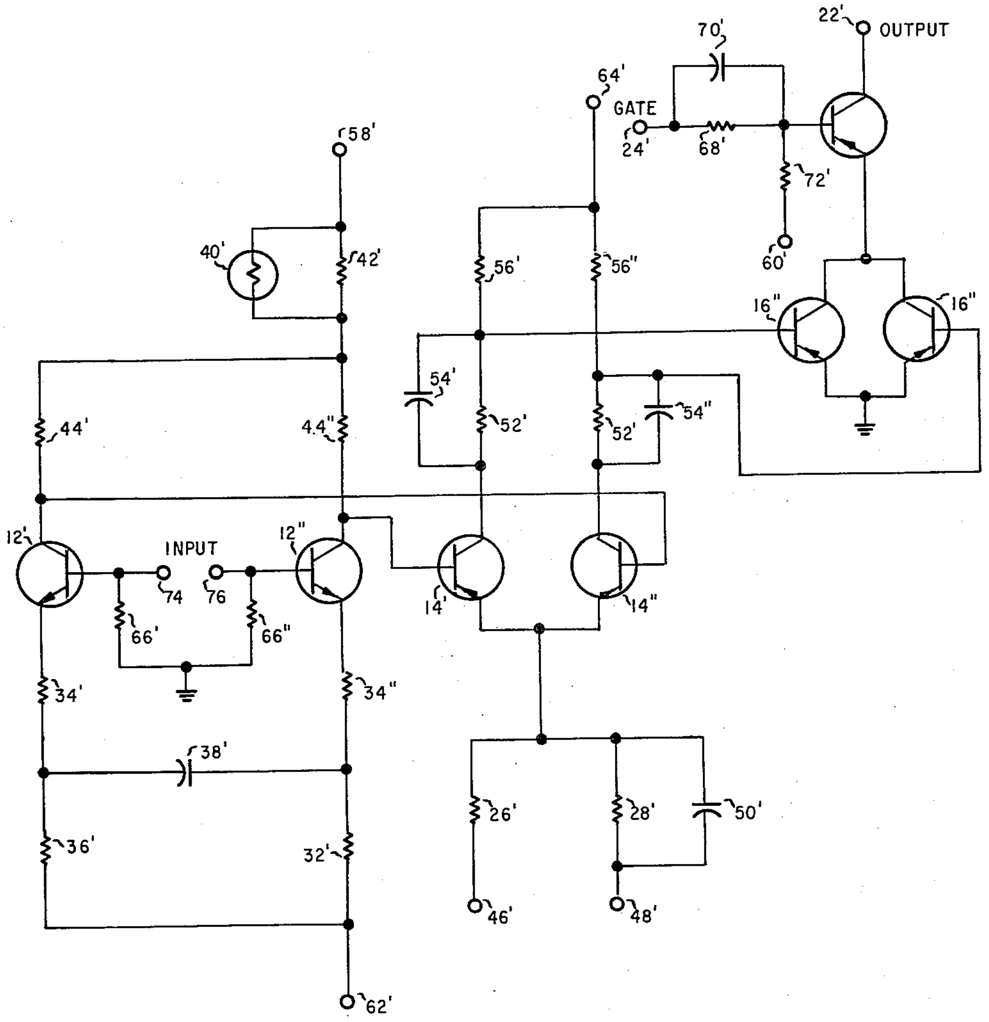

Other objects, features, and embodiments of the invention will be apparent from the following more detailed description of the illustrative embodiment with reference to the accompanying drawings, wherein:

FIG. 1 is a schematic diagram of a sense amplifier embodying the invention; and, FIG. 2 is a schematic diagram of a bipolar sense amplifier embodying the same principles.

The sense amplifier of FIG. 1 includes: a transistor 12, operating as a Class A amplifier; a transistor 14, operating as a discriminator; and, a combination of transistors 16 and 18, operating as pulse shapers and an output gate, respectively. The function of this circuit is to examine the signal input from a sense winding 20 connected to the base of transistor 12 and provide an output signal at terminal 22, if this input signal is a "1," i.e., if it exceeds a given rejection level for the discrimination circuitry connected to transistor 14. For example, if we assume a rejection level of −40 mv., the circuit will reject a −39 mv. "0" and pass a −41 mv. "1." The time at which the output terminal 22 is to be energized to provide a signal indication of the "0" or "1" on the input winding 20 is determined by an energizing strobe pulse applied, via terminal 24, to the base of transistor 18 which transistor is connected in a logical AND configuration with the pulse shaper transistor 16 serving as the output from the discrimination stage 14.

The circuitry connected to transistor 12 is so biased that the normal output signal from the cores connected to the input sense winding 20 leave the transistor operating in its active region, i.e., neither cut-off nor saturated. Transistor 14 is normally saturated and its emitter-to-base diode is maintained in a forward biased condition (in the transistor's quiescent state) by the voltage divider comprised of resistors 26 and 28 connected to its emitter. Since the first stage amplifier inverts the negative input pulse derived from winding 20, an input pulse greater than the rejection level will raise the voltage at the base of transistor 14 sufficiently to change it from saturated to active condition. This, in turn, saturates transistor 16 which is normally cut-off by the positive voltage on its base to provide an output pulse. The rejection level of the circuit may be defined as the input voltage which is just adequate to convert transistor 16 to conducting condition.

Referring to the circuitry connected to transistor 12, diode 30 and resistor 32 are employed to eliminate repetition rate sensitivity caused by large differentiated digit signals which occur when writing a "1" into the memory. These signals are the result of inductive coupling due to the proximity of the sense and digit windings in the physical arrangement of the memory array. In order that the sense amplifier maintain a constant rejection level, it is essential that the voltage at the junction of resistors 34 and 36 remain constant with changes in repetition rate. Consequently, the average value of current through the capacitor 38 must be "0." Since transistor 12 operates as a Class A amplifier only for the normal range of memory core output signals, the large negative noise pulses induced into the sense winding 20 from the drive winding (not shown) cause transistor 12 to cut off thereby preventing the main portion of the resulting pulse from reaching capacitor 38. The entire positive noise spikes, on the other hand, appear at this capacitor. If it were not for diode 30, the D.C. voltage at the junction of resistors 34 and 36 would, under the influence of these positive spikes, increase to a value necessary to maintain the average charge on the capacitor 38 at "0." With the diode 30 in circuit, however, it cuts off during the positive noise pulses to limit the current through capacitor 38 and thus cancels the effects of these noise spikes. Resistor 32 determines the current level at which diode 30 will cut off.

The network comprised by thermistor 40 and resistor 42 is designed to compensate for the effect of temperature variations upon transistor current and consequently the amplitude of the voltage signals at the collector of transistor 12. Compensation is accomplished by the thermistor 40 varying the serial effect of resistor 42 upon resistor 44 in the collector circuit.

As explained previously, with transistor 12 in normally conductive condition, transistor 14 which performs the discrimination function, is saturated. This clamps the collector of transistor 12 to the potential of the emitter of transistor 14, i.e., the junction of the voltage divider resistors 26 and 28 connected between terminals 46 and 48. This potential, which is determined by the voltages applied to terminals 46 and 48 and by the collector current in transistor 14, establishes the level of input signal necessary to bring transistor 14 out of saturation thereby lowering its collector voltage sufficiently to turn on transistor 16. This is the rejection, i.e., discrimination, level of the amplifier. When the input signal approaches rejection level, the voltage at the emitter of transistor 14 increases, since the collector current of this transistor has begun to decrease. To offset this effect and keep this voltage constant, resistor 28 is shunted by a relatively large capacitor 50.

Transistor 16, which performs a pulse shaping function in this amplifier, is coupled to the collector of discrimination transistor 14 via the parallel combination of resistor 52 and capacitor 54. Resistor 52 also cooperates in a voltage dividing operation with resistor 56 to reduce the quiescent voltage on the base of transistor 16. Capacitor 54 is utilized to decrease storage time of transistor 16.

As explained previously, transistor 18 connected serially in the collector circuit of transistor 16, performs a logical AND function and is energized only when an output strobe pulse is applied to gate 24. This eliminates the possibility of random noise disturbances on the sense line input 20 reaching the output terminal 22. Terminal 22 may be connected directly to the "set" terminal of an appropriate memory output flip-flop (not shown).

The illustrative circuit of FIG. 1 provides a sense amplifier which maintains a constant rejection level, i.e., discrimination between binary "0" and "1" despite fluctuations in voltage supply, variations in ambient temperature and changes in pulse repetition rate.

The circuit will meet the following specifications:

| | | |
|---|---|---|
| Rejection level | mv | −40 |
| Nominal output pulse width | mμsec | 500 |
| Nominal output rise time | mμsec | 55 |
| Nominal output fall time | mμsec | 40 |
| Nominal circuit delay | mμsec | 200 |

with the following suggested values of circuit components:

| | | |
|---|---|---|
| Transistor 12 | | 2N388 |
| Transistors 14, 16 and 18 | | 2N501 |
| Potential at terminals 58, 48 and 60 | volts | +4 |
| Potential at terminals 62, 64 and 46 | do | −10 |
| Thermistor 40 | | 2K |
| Resistor 42 | | 2.7K |
| Resistor 44 | | 3.48K |
| Resistor 66 | | 82Ω |
| Resistor 34 | | 47Ω |
| Resistor 36 | | 20K |
| Resistor 32 | | 15K |
| Diode 30 | | 1N634 |
| Resistor 56 | | 22K |
| Resistor 52 | | 2.7K |
| Capacitor 54 | μμf | 100 |
| Resistor 26 | | 22K |
| Resistor 28 | | 1.13K |
| Capacitor 50 | μf | 3.3 |
| Resistor 68 | | 2.2K |
| Capacitor 70 | μμf | 68 |
| Resistor 72 | | 10K |

The circuit has also operated successfully with a PNP amplifier and NPN discriminator with appropriate component an dpotential changes, instead of the PNP-NPN configuration shown.

In memory systems with high speed read-write cycles of the order of 2 microseconds or faster, large differentiated noise spikes resulting from digit drive pulses are a major obstacle. Copending Sylvania patent application S.N. 67,544, filed November 7, 1960, discloses a noise cancellation system for overcoming these spikes. This system, however, produces core output signals in both positive and negative directions. The amplifier shown in FIG. 2 is designed to sense these bipolar signals. The input to this amplifier is provided by connecting the two ends of the sense winding to input terminals 74 and 76, respectively. This amplifier serves the same discrimination purpose as the amplifier of FIG. 1 and its various component circuit elements, designated with prime and double prime reference characters, perform similar functions in a similar manner to corresponding circuit components in the arrangement of FIG. 1.

This bipolar amplifier will meet the following specifications:

| | | |
|---|---|---|
| Rejection level | mv | ±45 |
| Output pulse width | mμsec | 450 |
| Output rise time | mμsec | 40 |
| Output fall time | mμsec | 50 |
| Circuit delay | mμsec | 100 |

with the following suggested values of circuit components:

| | | |
|---|---|---|
| Transistors 12′, 12″ | | 2N388 |
| Transistors 14′, 14″, 16′, 16″, and 18′ | | 2N501 |
| Potential at terminals 58′, 48′ and 60′ | volts | +4 |
| Potential at terminals 62′, 46′ and 64′ | do | −10 |
| Thermistor 40′ | | 1K |
| Resistor 42′ | | 1K |
| Resistors 44′ and 44″ | | 2.74K |
| Resistors 66′ and 66″ | | 82Ω |
| Resistors 34′ and 34″ | | 47Ω |
| Resistors 32′ and 36′ | | 22.1K |
| Resistors 56′ and 56″ | | 12K |
| Resistors 52′ and 52″ | | 2.7K |
| Capacitors 54′ and 54″ | μμf | 100 |
| Resistor 26′ | | 22K |
| Resistor 28′ | | 332Ω |
| Capacitor 50′ | μf | 15 |
| Resistor 68′ | | 22K |
| Capacitor 70′ | μμf | 68 |
| Resistor 72′ | | 10K |

Although the invention has been described with reference to particular illustrative embodiments, it is not limited to the specific circuits and components shown and described, but embraces the full scope of the following claims.

What is claimed is:

1. An amplifier circuit comprising: an input terminal; a first transistor having collector, emitter and base electrodes, said transistor being of one conductivity type; means coupling said input terminal to said base electrode of said transistor; a voltage supply for said transistor; means for causing said transistor to operate as a Class A amplifier of signals, within a given range of amplitude, applied to said input terminal; a second transistor having collector, emitter and base electrodes, said second transistor being of a conductivity type opposite to the conductivity type of said first transistor; means coupling the collector of said first transistor to the base of said second transistor; means for causing said second transistor to conduct in saturated condition when said first transistor is conducting without signal input; means for causing the potential at the emitter electrode of said second transistor substantially to equate the potential at the collector of said first transistor when said first transistor is so conducting without signal input, despite amplitude fluctuations in said voltage supply; a third transistor having collector, emitter and base electrodes; means for coupling the collector of said second transistor to the base of said third transistor; means for causing said third transistor to be in cut-off condition while said second transistor is in saturated condition; means for causing said second transistor to convert from saturated to non-saturated conduction in response to a signal exceeding a given amplitude from said first transistor; and means controlled by said change in conducting condition of said second transistor for converting said third transistor from cut-off to conducting condition.

2. For bipolar signals transmitted by a conductor having terminals at either end, an amplifier comprising: first, second, third, fourth, fifth and sixth transistors, each having collector, emitter and base electrodes; said first and second transistors being of the same conductivity type; said third and fourth transistors being of similar conductivity type to each other, but of opposite conductivity type to said first and second transistors; a common voltage supply for said first and second transistors connected, respectively, to the base electrodes of said first and second transistors; means for causing said first and second transistors to conduct as Class A amplifiers; means for causing said third and fourth transistors to function as a discrimination circuit; means connecting the collector of said first transistor to the base of said third transistor; means for connecting the collector of said second transistor to the base of said fourth transistor; means for causing said third and fourth transistors to conduct in saturated condition when said first and second transistors are conducting without signal input; means for causing the emitters of said third and fourth transistors and the collectors of said first and second transistors to maintain substantially equal potential, despite fluctuations in said voltage supply, while their respective transistors are so conducting; means connecting the collector of said third transistor to the base of said fifth transistor; means connecting the collector of said fourth transistor to the base of said sixth transistor; means for causing said fifth and sixth transistors to be cut off when said third and fourth transistors are in saturated condition; means for causing said third and fourth transistors to convert from saturated to unsaturated condition in response to a signal exceeding a given amplitude from said first and second transistors; and means controlled by the unsaturated condition of said third and fourth transistors, respectively, for converting said fifth and sixth transistors, respectively, from cut-off to conducting condition when signals exceeding a given amplitude, but of either positive or negative polarity, are applied between said terminals connected to said first and second transistor bases.

3. In an amplifier circuit, a supply voltage, a transistorized Class A amplification circuit, a transistorized discrimination circuit, said circuits each having a transistor of an opposite conductivity type to that of a transistor in the other of said circuits, means for coupling said discrimination circuit and said amplification circuit so that as said supply voltage varies, the threshold voltage of the sense amplifier remains constant, and means for coupling said circuits so that any changes in transistor parameters due to temperature variance are neutralized.

References Cited in the file of this patent

UNITED STATES PATENTS

| | | |
|---|---|---|
| 2,964,656 | Bissell et al. | Dec. 13, 1960 |
| 2,981,853 | Meyer | Apr. 25, 1961 |
| 3,003,113 | MacNichol | Oct. 3, 1961 |